(12) United States Patent
Cai (10) Patent No.: US 8,855,597 B2
(45) Date of Patent: Oct. 7, 2014

(54) USER EQUIPMENT TIMESTAMPS FOR OFFLINE CHARGING IN IMS NETWORKS

(75) Inventor: Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1324 days.

(21) Appl. No.: 11/618,004

(22) Filed: Dec. 29, 2006

(65) Prior Publication Data

US 2008/0159499 A1  Jul. 3, 2008

(51) Int. Cl.
  *H04M 3/42* (2006.01)
  *H04M 11/00* (2006.01)
  *H04L 12/66* (2006.01)
  *H04W 4/00* (2009.01)
  *H04L 12/28* (2006.01)
  *H04M 15/00* (2006.01)
  *H04L 12/14* (2006.01)

(52) U.S. Cl.
  CPC ............ *H04L 12/14* (2013.01); *H04L 12/1439* (2013.01); *H04L 12/1403* (2013.01)
  USPC ........ 455/406; 455/414.1; 455/405; 370/352; 370/328; 370/431; 379/114.01

(58) Field of Classification Search
  CPC .............. H04L 61/3085; H04L 67/325; H04L 65/1016; H04L 65/1006; H04M 2215/208
  USPC ................ 455/456.1, 422.1, 414.1, 405, 406, 455/435.1; 370/352, 329, 328, 432, 209.01, 370/431; 379/114, 215, 114.01–114.29; 701/517
  See application file for complete search history.

(56) References Cited

U.S. PATENT DOCUMENTS

| | | | | |
|---|---|---|---|---|
| 5,732,387 A | * | 3/1998 | Armbruster et al. | ......... 455/13.2 |
| 6,778,819 B2 | * | 8/2004 | Sumino | ....................... 455/412.1 |

(Continued)

FOREIGN PATENT DOCUMENTS

| | | |
|---|---|---|
| JP | 8307560 | 11/1996 |
| WO | WO2004004301 A1 | 1/2004 |

(Continued)

OTHER PUBLICATIONS

"Universal Mobile Telecommunications System (UMTS), Telecommunication management, Charging management, Charging data record (CDR) parameter description (3GPP TS 32.298 version 6.4.1 Release 6), ETSI TS 132 298," Jun. 1, 2006, pp. 1-122, vol. 3-SA5, No. V6.4.1, XP014035706 ISSN 000-0001, ETSI Standards, LIS, Sophia Antipolis Cedex, France.

(Continued)

*Primary Examiner* — Nizar Sivji
(74) *Attorney, Agent, or Firm* — Duft, Bornsen & Fettig, LLP (57) ABSTRACT

Communication networks and associated methods are disclosed that provide offline charging in IMS networks. One of the methods includes receiving call signaling for a call from an access network serving user equipment for the call. The call signaling includes an access network identifier for the access network. The method further includes identifying location information related to the access network identifier. The method further includes determining a local time for the user equipment based on the location information. The method further includes generating a charging message for the call, and inserting a timestamp in the charging message based on the local time for the user equipment. The timestamp in the charging message provides the billing system with the local time for the user equipment to allow for variable-rate billing.

17 Claims, 5 Drawing Sheets

(56) References Cited

U.S. PATENT DOCUMENTS

| | | |
|---|---|---|
| 2003/0027595 A1* | 2/2003 | Ejzak .......................... 455/560 |
| 2005/0058125 A1* | 3/2005 | Mutikainen et al. .......... 370/354 |
| 2005/0213721 A1* | 9/2005 | Hakala et al. ............ 379/114.01 |
| 2006/0058010 A1* | 3/2006 | Williams et al. ........... 455/414.1 |
| 2006/0229084 A1* | 10/2006 | Noldus et al. .............. 455/456.1 |
| 2007/0213031 A1* | 9/2007 | Ejzak et al. .................. 455/406 |

FOREIGN PATENT DOCUMENTS

| WO | WO2004045195 | 5/2004 |
|---|---|---|
| WO | WO2004012943 | 11/2004 |

OTHER PUBLICATIONS

"Universal Mobile Telecommunications System (UMTS), Telecommunication management, Charging management,, Location Services (LCS) charging (3GPP TS 32.271 version 6.2.0 Release 6) ETSI TS 132 271," Sep. 1, 2005, pp. 1-28, vol. 3-SA5, No. V6.2.0, XP014032022 ISSN 0000-0001, ETSI Standards, LIS, Sophia Antipolis Cedex, France.

"3rd Generation Partnership Project;Technical Specification Group Services and System Aspects;Telecommunication management;Charging management;Charging architecture and principles(Release 6)" 3GPP TS 32.240 V6.0.0 (Sep. 2004).

* cited by examiner

USER EQUIPMENT TIMESTAMPS FOR OFFLINE CHARGING IN IMS NETWORKS

BACKGROUND OF THE INVENTION

1. Field of the Invention

The invention is related to the field of communications and, in particular, to inserting timestamps for user equipment in charging messages to provide improved offline charging in IMS networks.

2. Statement of the Problem

One type of communication network gaining popularity is an IP Multimedia Subsystem (IMS) network. As set forth in the 3$^{rd}$ Generation Partnership Project (3GPP) or 3GPP2, IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network, as IP networks have become the most cost savings bearer network to transmit video, voice, and data. The signaling used within IMS networks is typically Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

For a typical call (or session) within an IMS network, user equipment of a calling party initiates the call through an access network, such as a CDMA network, a GSM network, an IP network, a WiFi network, a WiMAX network, etc. The access network then routes the call to the IMS network. If the access network does not use the same protocols as the IMS network (e.g., SIP and IP), then the access network may route the call to the IMS network through an appropriate gateway. A serving-call session control function (S-CSCF) in the IMS network receives and serves the call in the appropriate manner. The S-CSCF may also contact one or more application servers (AS) in the IMS network to provide services for the call, such as voicemail, call forwarding, etc. To provide charging for the call, each of the IMS nodes (e.g., S-CSCF and AS) handling the call generates charging messages typically in Diameter protocol (Rf). In addition to other call related data, the IMS nodes insert a timestamp into the charging messages. The timestamp is based on a local time for the IMS node.

One problem with present offline charging in IMS networks is that a service provider cannot provide variable-rate billing, such as free nights and weekends, according to the present standards. Because the timestamp inserted in the charging messages is based on a local time for the IMS node generating the charging message, the billing system does not know when a time or day threshold is reached for a particular subscriber. For instance, if a subscriber is located in the Pacific Time zone and an IMS node generating the charging message is located in the Eastern Time zone, then the billing system cannot presently determine when the subscriber has reached a time threshold to allow for free nights and weekends. The billing system only has the local time for the IMS node which may not correlate to the local time for the subscriber. Service providers are thus forced to use flat-rate billing instead of allowing for variable-rate billing.

SUMMARY OF THE SOLUTION

The invention solves the above and other problems by inserting a timestamp, based on the local time for user equipment of a call, into a charging message instead of a timestamp based on the local time for an IMS node. By having the local time for the user equipment, a billing system may provide variable-rate billing based on the timestamps in the charging messages. Service providers can advantageously offer different rate plans to their subscribers, such as free nights and weekends.

One embodiment of the invention includes a method of providing offline charging in an IMS network. The method includes receiving call signaling for a call from an access network serving user equipment for the call. The call signaling includes an access network identifier for the access network. The method further includes identifying location information related to the access network identifier, such as by querying a location server. The method further includes determining a local time for the user equipment based on the location information. The method further includes generating a charging message for the call, and inserting a timestamp in the charging message based on the local time for the user equipment. The timestamp in the charging message provides the billing system with the local time for the user equipment to allow for variable-rate billing.

Another embodiment of the invention includes another method of providing offline charging in an IMS network. The method includes receiving call signaling for a call from an access network serving user equipment for the call. The call signaling includes an access network identifier for the access network. The method further includes identifying location information related to the access network identifier. The method further includes determining a time zone where the user equipment is located based on the location information. The method further includes identifying a local time for an IMS node serving the call, and adjusting the local time for the IMS node based on the time zone of the user equipment to generate a timestamp. The method further includes generating a charging message for the call, and inserting the timestamp in the charging message. The timestamp in the charging message provides the billing system with the local time for the user equipment to allow for variable-rate billing.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
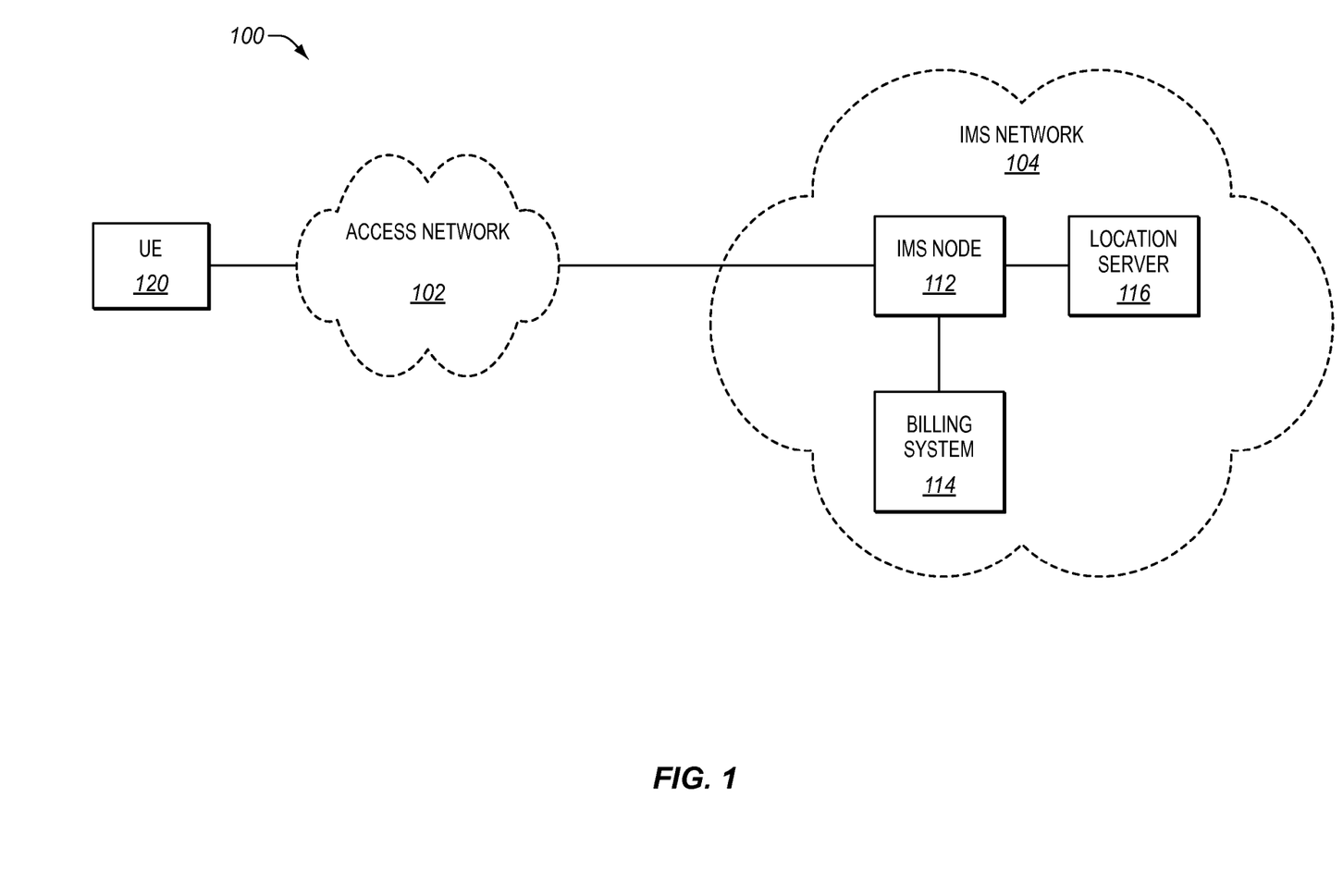
FIG. 1 illustrates a communication network in an exemplary embodiment of the invention.

FIG. 1 illustrates a communication network 100 in an exemplary embodiment of the invention. Communication network 100 includes an access network 102 and an IMS network 104. Access network 102 may comprise a wireline network, such as an IP network, or a wireless network, such as a CDMA network, a GSM network, a WiFi network, or a WiMAX network. Access network 102 is adapted to provide service to user equipment (UE) 120 to place or receive calls (or sessions). IMS network 104 includes one or more IMS nodes 112 and a billing system 114. IMS network 104 may optionally include a location server 116. IMS node 112 comprises any system, server, application, or function adapted to serve a call in IMS network 104. IMS node 112 may comprise a serving-call session control function (S-CSCF), an application server (AS), a media gateway (MGW), a Charging Data Function (CDF)/Charging Gateway Function (CGF), a Charging Collector Function (CCF), or another type of network node. Billing system 114 comprises any system, server, application, or function adapted to receive charging messages and provide billing, rating, and/or auditing functions.

Assume for this embodiment that UE 120 initiates or receives a call through access network 102. To handle the call, access network 102 exchanges call signaling with IMS network 104. Access network 102 (or the appropriate node in access network 102) or IMS network 104 inserts an access network identifier in the call signaling. An access network identifier comprises any code, number, character string, or other identifier for access network 102 or a node in access network 102. For example, if access network 102 comprises a WiFi network, then the access network identifier may comprise a MAC address of the access point (not shown in FIG. 1) that is serving UE 120. The nodes inserting the access network identifier may comprise an access point, a proxy-call session control function (P-CSCF), a gateway, or another node.

Figure 2:
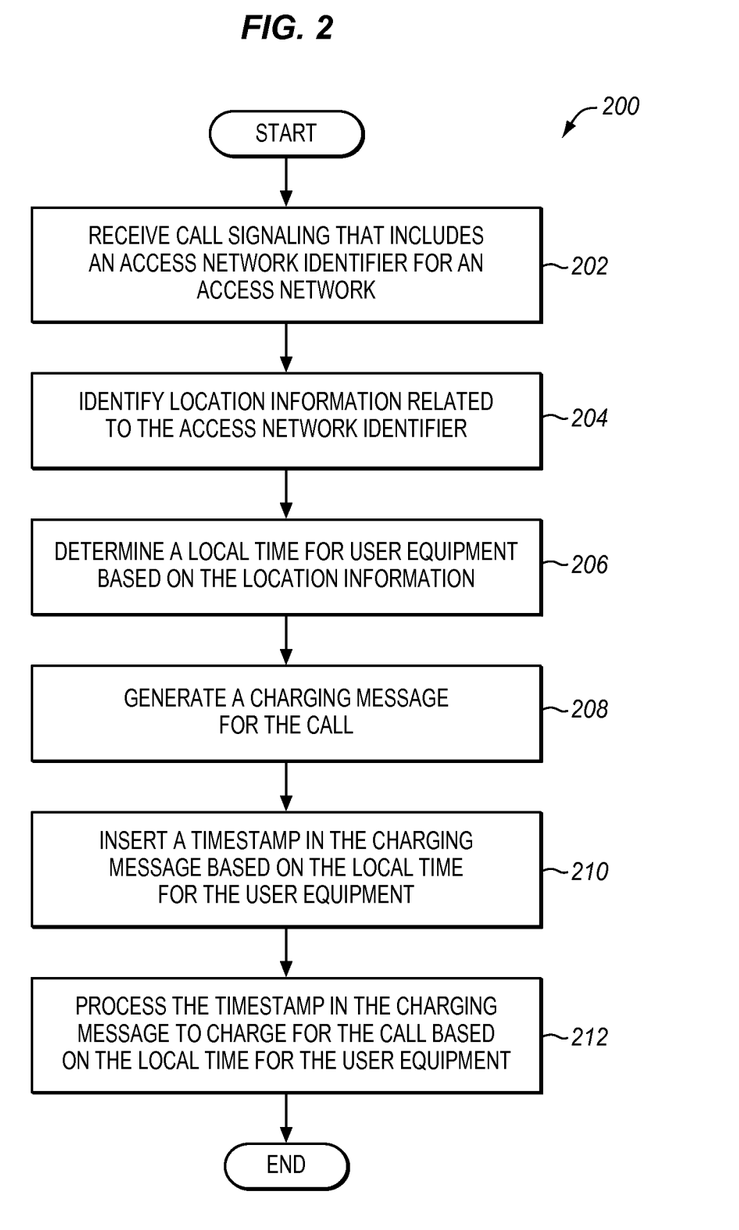
FIG. 2 is a flow chart illustrating a method of operating a communication network to provide offline charging in an exemplary embodiment of the invention.

FIG. 2 is a flow chart illustrating a method 200 of operating communication network 100 to provide offline charging in an exemplary embodiment of the invention. The steps of method 200 will be described with reference to communication network 100 in FIG. 1. The steps of the flow chart in FIG. 2 are not all inclusive and may include other steps not shown.

Step 202 of method 200 comprises receiving call signaling for the call, where the call signaling includes the access network identifier. IMS node 112 may receive and process the call signaling, or the call signaling may be processed in IMS network 104 prior to IMS node 112. Thus, IMS node 112 receives what is termed a call-related message for the call. The call-related message may comprise any type of call signaling or charging message used to handle a call. In one example, the call-related message may comprise a SIP INVITE message used to set up a call. In another example, the call-related message may comprise a SIP REGISTER message used to register UE 120 with IMS network 104. In another example, the call-related message may comprise a Diameter Accounting Request (ACR) message. The call-related message includes the access network identifier for access network 102.

In step 204, IMS node 112 identifies location information related to the access network identifier provided in the call-related message. Location information may comprise a street address, a latitude/longitude, a city/state, or another type of location. The location information may also indicate a time zone related to a particular location or the local time for a particular location.

In step 206, IMS node 112 determines a local time for UE 120 based on the location information. For instance, IMS node 112 may determine the local time for UE 120 by identifying the local time for IMS node 112, determining an offset between the time zone for IMS node 112 and the time zone for UE 120, and then adjusting the local time for IMS node 112 based on the offset between the time zones.

In step 208, IMS node 112 generates a charging message for the call. A charging message comprises any message or signaling used to report call information for the purpose of charging for the call. The charging message may comprise a Diameter Accounting Request (ACR) message, a Charging Data Record (CDR), or another type of message. In step 210, IMS node 112 inserts a timestamp in the charging message based on the local time for UE 120 to provide billing system 114 with the local time for UE 120. IMS node 112 may insert the timestamp in a particular header or parameter of the charging message. The timestamp may be a start or a stop timestamp.

In step 212, billing system 114 receives the charging message and processes the timestamp in the charging message to charge for the call based on the local time for UE 120. Because billing system 114 has the local time for UE 120, billing system 114 can advantageously provide variable-rate billing for the call based on the local time for UE 120. In present IMS networks, billing system 114 would receive a charging message that includes the local time for IMS node 112, not the local time for UE 120. Thus, where billing system 114 could not provide variable-rate billing in present IMS networks, billing system 114 can provide the variable-rate billing according to method 200 described above.

Figure 3:
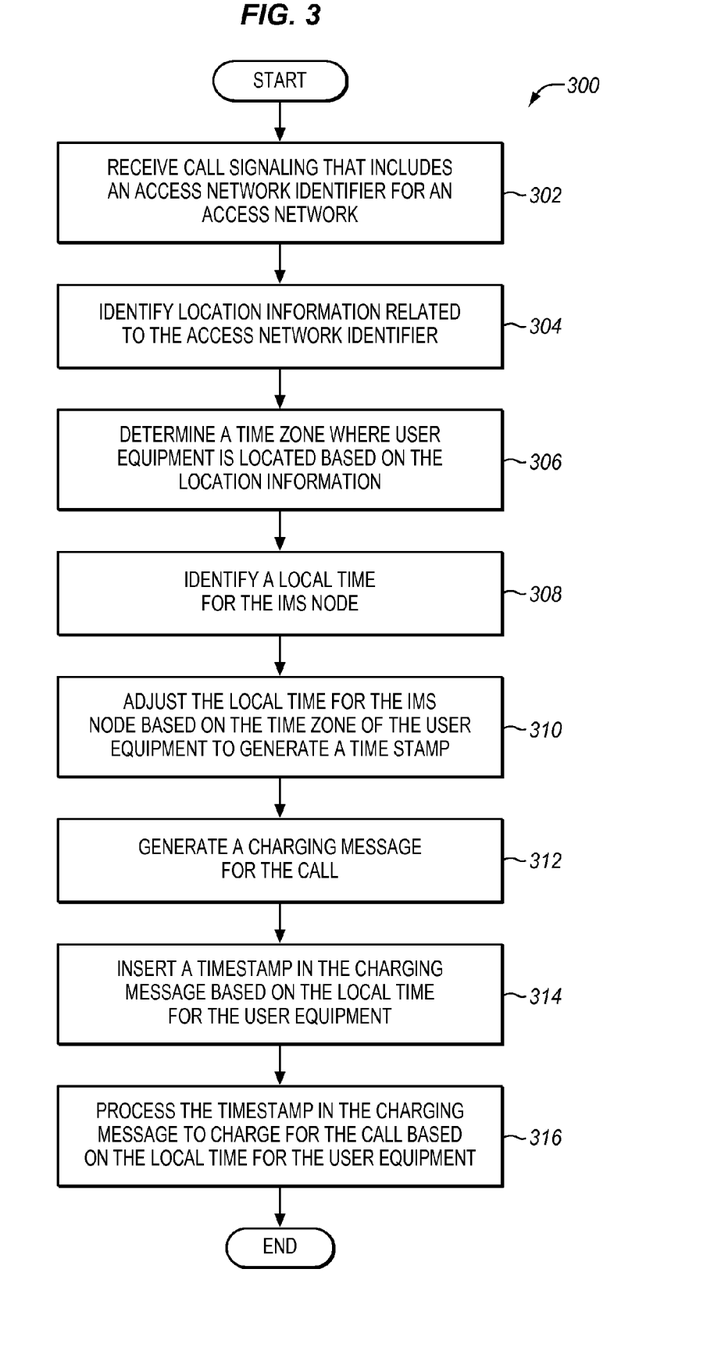
FIG. 3 is a flow chart illustrating an alternative method of operating a communication network to provide offline charging in an exemplary embodiment of the invention.

FIG. 3 is a flow chart illustrating an alternative method 300 of operating communication network 100 to provide offline charging in an exemplary embodiment of the invention. The steps of method 300 will be described with reference to communication network 100 in FIG. 1. The steps of the flow chart in FIG. 3 are not all inclusive and may include other steps not shown.

Step 302 of method 300 comprises receiving call signaling that includes an access network identifier. Again, IMS node 112 may receive and process the call signaling, or the call signaling may be processed in IMS network 104 prior to IMS node 112. Thus, IMS node 112 receives what is termed a call-related message for the call.

In step 304, IMS node 112 identifies location information related to the access network identifier provided in the call-related message. In step 306, IMS node 112 determines a time zone where UE 120 is located based on the location information. For instance, the location information may include time zone information, or IMS node 112 may be able to identify an address in the location information which it can correlate to a particular time zone. In step 308, IMS node 112 identifies a local time for IMS node 112. IMS node 112 may include an internal clock or may be able to query another network node to obtain a local time. In step 310, IMS node 112 adjusts the local time for IMS node 112 based on the time zone of UE 120 to generate a timestamp. The timestamp indicates the local time for UE 120. In step 312, IMS node 112 generates a charging message for the call. In step 314, IMS node 112 inserts the timestamp in the charging message to provide billing system 114 with the local time for UE 120.

In step 316, billing system 114 receives the charging message and processes the timestamp in the charging message to charge for the call based on the local time for UE 120.

Because billing system 114 has the local time for UE 120, billing system 114 can advantageously provide variable-rate billing for the call based on the local time for UE 120.

Figure 4:
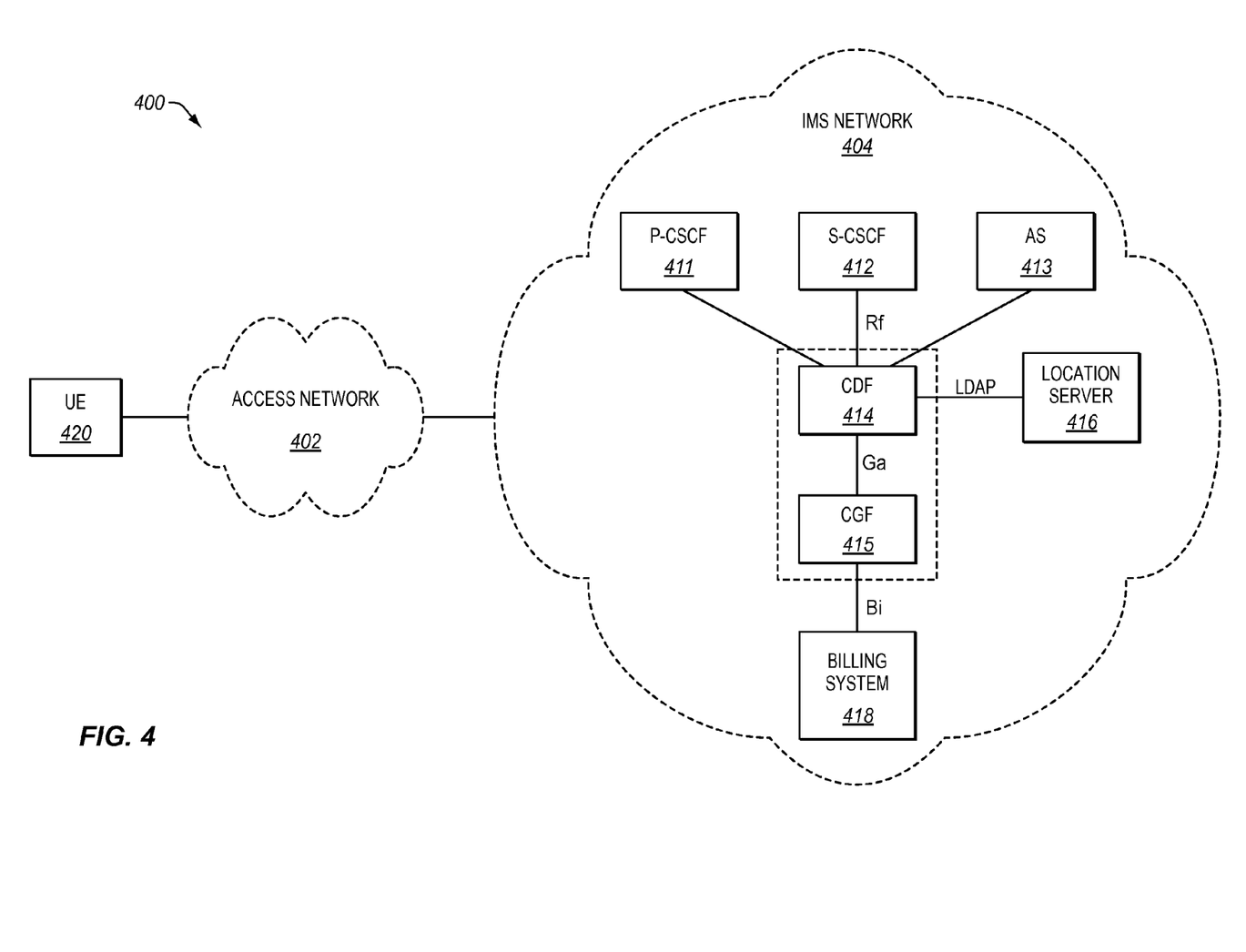
FIGS. 4-5 illustrate another communication network in an exemplary embodiment of the invention.

FIG. 4 illustrates another communication network 400 in an exemplary embodiment of the invention. Communication network 400 includes an access network 402 and an IMS network 404. Access network 402 is adapted to provide service to user equipment (UE) 420 to place or receive calls (or sessions). IMS network 404 includes a P-CSCF 411, an S-CSCF 412, one or more application servers (AS) 413, a Charging Data Function (CDF) 414, a Charging Gateway Function (CGF) 415, a location server 416, and a billing system 418. A combination CDF/CGF is shown in FIG. 4 as suggested by the 3GPP in 3GPP TS 32.240 and TS 32.299 Release 6 that is available at www.3gpp.org. In another embodiment, a Charging Collector Function (CCF) may be used in place of the CDF/CGF as suggested by the 3GPP in TS 32.240 and TS 32.225 Release 5.

Assume for this embodiment that UE 420 initiates a call through access network 402. Access network 402 receives a SIP INVITE message from UE 420 to initiate the call. UE 420 may identify an access network identifier and insert the access network identifier into the INVITE message. Alternatively, access network 402 may identify the access network identifier and insert the access network identifier into the INVITE message. Alternatively, P-CSCF 411 may identify the access network identifier and insert the access network identifier into the INVITE message. In any of these cases, access network 402 routes the INVITE message to P-CSCF 411. P-CSCF 411 then routes the INVITE message to S-CSCF 412 and AS 413 as needed to handle the call.

P-CSCF 411, S-CSCF 412, and AS 413 each store the access network identifier that was provided in the INVITE message. When any of these IMS nodes performs a call function that triggers charging, the node generates a charging message, such as a Diameter Rf ACR message. The IMS node then inserts the access network identifier in a new AVP of the ACR message, and transmits the ACR message to CDF 414.

Responsive to receiving the ACR message and processing the access network identifier, CDF 414 queries (e.g., LDAP) location server 416 based on the access network identifier to retrieve location information related to the access network identifier. The location information indicates to CDF 414 in which time zone UE 420 is located. CDF 414 identifies a local time, and determines an offset between the time zone for CDF 414 and the time zone for UE 420. CDF 414 adjusts its local time based on the offset in the time zones to generate a timestamp, or creates a new field for the UE 420 local timestamp. The timestamp indicates the local time for UE 420. CDF 414 then generates a charging message, such as a Charging Data Record (CDR), and inserts the timestamp in the CDR. When the CDR is populated with the proper data, CDF 414 transmits the CDR to CGF 415. CGF 415 aggregates the CDR with other CDRs, and transmits the CDRs to billing system 418.

Billing system 418 processes the timestamp in the charging message to charge for the call based on the local time for UE 420. Because billing system 414 has the local time for UE 420, billing system 414 can advantageously provide variable-rate billing for the call based on the local time for UE 420.

The above example illustrates inserting the access network identifier in a SIP INVITE message. Other embodiments may comprise inserting the access network identifier into other SIP messages. For instance, the access network identifier may be inserted in a SIP REGISTER message that is used by UE 420 to register with IMS network 404. Nodes in IMS network 404 may then store the access network identifier provided in the REGISTER message for use in determining the local time for UE 420.

Figure 5:
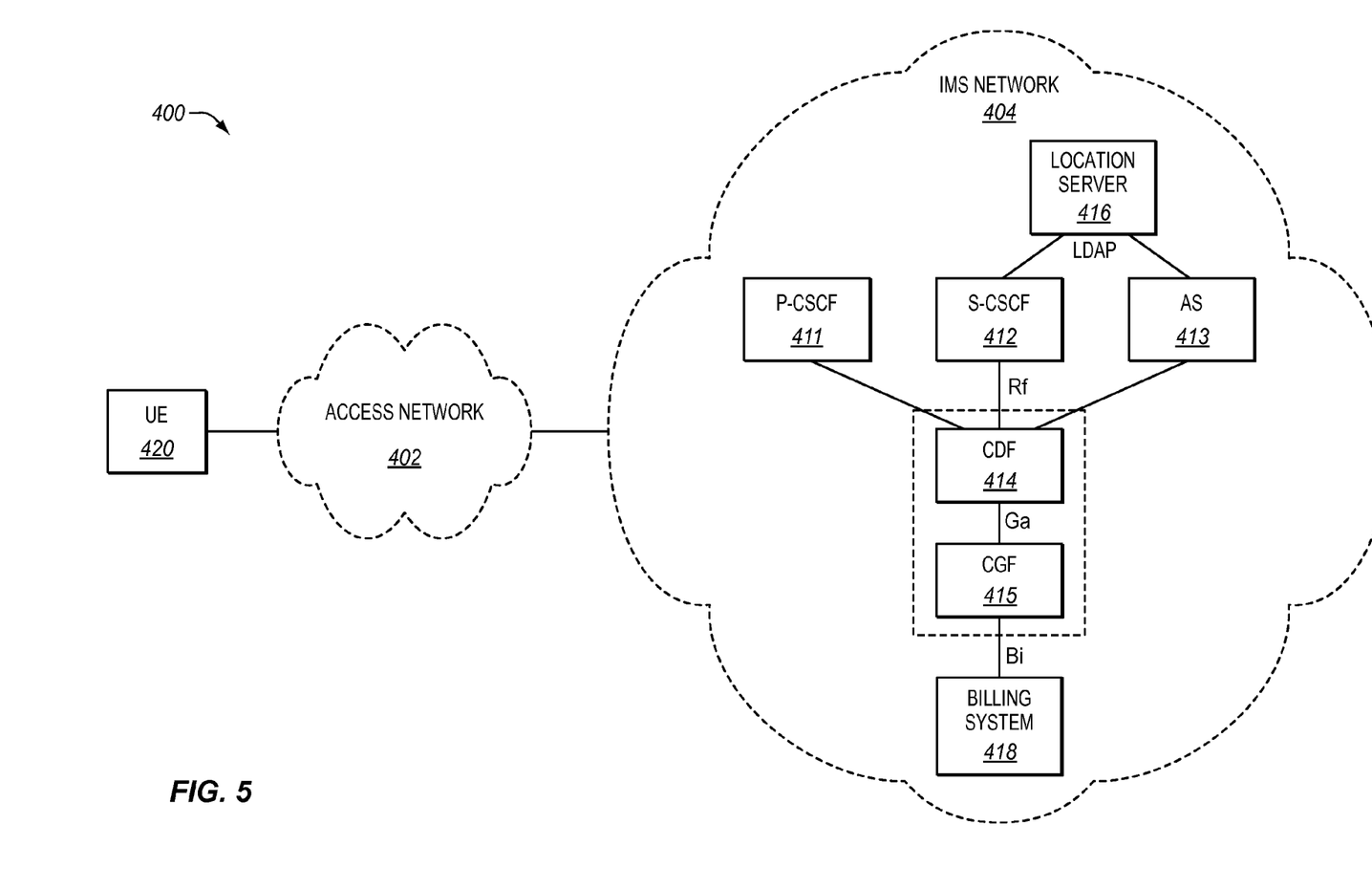

Other IMS nodes in IMS network 404 may additionally or alternatively be adapted to determine the local time for UE 420 and insert the appropriate timestamp for UE 420 in the charging message. Another embodiment of communication network 400 is illustrated in FIG. 5. In this embodiment, S-CSCF 412 and AS 413 are adapted to determine the local time for UE 420 and insert the appropriate timestamp in a charging message.

Again, access network 402 receives a SIP INVITE message from UE 420 to initiate a call. UE 420 may identify an access network identifier and insert the access network identifier into the INVITE message, access network 402 may identify the access network identifier and insert the access network identifier into the INVITE message, or P-CSCF 411 may identify the access network identifier and insert the access network identifier into the INVITE message. In any of the cases, access network 402 routes the INVITE message to P-CSCF 411. P-CSCF 411 then routes the INVITE message to S-CSCF 412 and AS 413 as needed to handle the call.

P-CSCF 411, S-CSCF 412, and AS 413 each store the access network identifier. When any of these IMS nodes (e.g., S-CSCF 412) perform a call function that triggers charging, S-CSCF 412 queries location server 416, based on the access network identifier, to retrieve location information related to the access network identifier. The location information indicates to S-CSCF 412 in which time zone UE 420 is located. S-CSCF 412 identifies a local time and determines an offset between the time zone for S-CSCF 412 and the time zone for UE 420. S-CSCF 412 adjusts its local time based on the offset in the time zones to generate a timestamp. Alternatively, S-CSCF 412 creates a new AVP for the UE 420 local timestamp. The timestamp indicates the local time for UE 420. S-CSCF 412 then generates a charging message, such as a Diameter Rf ACR message, and inserts the UE 420 local timestamp AVP in the ACR. When the ACR is populated with the proper data, S-CSCF 412 transmits the ACR to CDF 414.

CDF 414 processes the ACR and generates a CDR. CDF 414 then maps parameters from the ACR to the CDR including the timestamp that indicates the local time for UE 420. CDF 414 then transmits the CDR to CGF 415. CGF 415 aggregates the CDR with other CDRs, and transmits the CDRs to billing system 418.

Billing system 418 processes the timestamp in the charging message to charge for the call based on the local time for UE 420. Because billing system 414 has the local time for UE 420, billing system 414 can advantageously provide variable-rate billing for the call based on the local time for UE 420.

Although specific embodiments were described herein, the scope of the invention is not limited to those specific embodiments. The scope of the invention is defined by the following claims and any equivalents thereof.

I claim:
1. A system comprising:
   a Serving-Call Session Control Function (S-CSCF) for an IP Multimedia Subsystem (IMS) core network that is configured to:
   receive a session-related message for user equipment (UE) from an access network that is serving the UE, wherein the session-related message includes an identifier for the access network that provides service to the UE for accessing the IMS core network;
   identify location information related to the access network identifier in the session-related message;

determine a time zone where the UE is located based on the location information;
identify a local time for the S-CSCF based on an internal clock;
adjust the local time for the S-CSCF based on the time zone of the UE to determine a local time for the UE;
generate a Diameter charging message for the session;
insert a timestamp in an Attribute Value Pair (AVP) of the Diameter charging message based on the local time for the UE; and
transmit the Diameter charging message to an offline charging function.

2. The system of claim 1 wherein:
the access network identifier is inserted in the session-related message by the UE.

3. The system of claim 1 wherein:
the Diameter charging message comprises a Diameter Accounting Request (ACR).

4. The system of claim 1 wherein:
the access network identifier is inserted in the session-related message by the access network.

5. The system of claim 1 wherein:
the S-CSCF is configured to query a location server based on the network access identifier to identify the location information.

6. The system of claim 1 wherein:
the access network identifier comprise a MAC address of an access point in the access network.

7. The system of claim 1 wherein:
the session-related message comprises a Session Initiation Protocol (SIP) message that includes the access network identifier.

8. A method comprising:
receiving, in a Serving-Call Session Control Function (S-CSCF) of an IP Multimedia Subsystem (IMS) core network, a session-related message for user equipment (UE) from an access network that is serving the UE, wherein the session-related message includes an identifier for the access network that provides service to the UE for accessing the IMS core network;
identifying location information in the S-CSCF that is related to the access network identifier in the session-related message;
determining, in the S-CSCF, a time zone where the UE is located based on the location information;
identifying a local time for the S-CSCF based on an internal clock;
adjusting the local time for the S-CSCF based on the time zone of the UE to determine a local time for the UE;
generating a Diameter charging message for the session;
inserting a timestamp in an Attribute Value Pair (AVP) of the Diameter charging message based on the local time for the UE; and
transmitting the Diameter charging message from the S-CSCF to an offline charging function.

9. The method of claim 8 wherein:
the Diameter charging message comprises a Diameter Accounting Request (ACR).

10. The method of claim 8 wherein identifying location information related to the access network identifier comprises:
querying a location server with the S-CSCF based on the network access identifier to identify the location information.

11. The method of claim 8 wherein:
the access network identifier comprise a MAC address of an access point in the access network.

12. The method of claim 8 wherein:
the access network identifier is inserted in the session-related message by the UE.

13. A system comprising:
an offline charging server configured to receive a Diameter charging message from a node of an IP Multimedia Subsystem (IMS) core network, and to process the Diameter charging message to identify an access network identifier in an Attribute Value Pair (AVP) of the Diameter charging message, wherein the access network identifier comprises data that indicates an access network that provides service to the UE for accessing the IMS core network;
the offline charging server is configured to identify location information related to the access network identifier in the Diameter charging message, to determine a time zone where the UE is located based on the location information, to identify a local time for the offline charging server based on an internal clock, to adjust the local time for the offline charging server based on the time zone of the UE to determine a local time for the UE, to generate a Charging Data Record (CDR) for the session, to insert a timestamp in the CDR based on the local time for the UE, and to transmit the CDR to a billing system.

14. The system of claim 13 wherein:
the Diameter charging message comprises a Diameter Accounting Request (ACR) message.

15. The system of claim 13 wherein:
the offline charging server is configured to query a location server based on the network access identifier to identify the location information.

16. The system of claim 13 wherein:
the access network identifier comprise a MAC address of an access point in the access network.

17. The system of claim 13 wherein:
the offline charging server includes a Charging Data Function (CDF) and a Charging Gateway Function (CGF).

* * * * *